United States Patent [19]

Hermann, Jr.

[11] Patent Number: 4,668,104
[45] Date of Patent: May 26, 1987

[54] SELF-LUBRICATING MEMBER WITH STRIP PATTERN

[76] Inventor: Rudolph J. Hermann, Jr., 8536 Gates, Romeo, Mich. 48065

[21] Appl. No.: 918,631

[22] Filed: Oct. 14, 1986

Related U.S. Application Data

[63] Continuation of Ser. No. 687,953, Dec. 31, 1984, abandoned.

[51] Int. Cl.⁴ .......................................... F16C 29/02
[52] U.S. Cl. ........................................ 384/13; 384/40
[58] Field of Search .................. 384/13, 40, 291, 292, 384/283, 907, 910

[56] References Cited

U.S. PATENT DOCUMENTS

| | | | |
|---|---|---|---|
| 1,299,799 | 4/1919 | Smalley | 384/283 |
| 1,398,220 | 11/1921 | Acheson | 384/283 |
| 4,252,381 | 2/1981 | Kimmelaar | 308/5 R |

*Primary Examiner*—Lenard A. Footland
*Attorney, Agent, or Firm*—Reising, Ethington, Barnard, Perry & Milton

[57] ABSTRACT

A wear plate for reciprocating machine members is disclosed. It comprises a rectangular metal body with a composite wear surface including plural strip-shaped metal lands with a groove between adjacent lands. The lands and grooves have parallel edges and extend across the surfaces at an angle of about forty-five degrees to one one edge of the body. Each groove is filled with a strip of solid lubricant and the exposed surface of the lands and strips are co-planar. The wear plate provides equal lubricity for sliding friction across the wear plate surface in either of two directions which are mutually perpendicular.

5 Claims, 4 Drawing Figures

U.S. Patent    May 26, 1987    4,668,104

SELF-LUBRICATING MEMBER WITH STRIP PATTERN

This application is a continuation of application Ser. No. 687,953, filed Dec. 3, 1984, abandoned.

FIELD OF THE INVENTION

This invention relates to wear plates for machines and more particularly, to wear plates of the type provided with a solid lubricant.

BACKGROUND OF THE INVENTION

It is common practice in machines such as power presses to provide lubricated wear plates for reducing the sliding friction between reciprocating machine members in surface engagement with each other. A typical installation in a press, for example, includes a wear plate provided with a solid lubricant mounted on each post of the movable platen and a plain steel wear plate mounted in face-to-face opposition on the stationary post of the fixed platen. The lateral thrust forces resulting from die closure are transmitted by the wear plates on the posts of the movable platen to the wear plates on the posts of the fixed platen. Extremely large lateral thrust forces may be transmitted between mating wear plates during sliding contact therebetween. There is a need for a self-lubricated wear plate capable of operating in the rugged environment of power presses and the like with a high load capacity and a high degree of durability. Reliability and long life are especially important in view of the high cost of down-time in the use of power presses and the like. Further, there is a demand for such self-lubricated wear plates which can be supplied at relatively low cost.

It is well known to provide wear plates with a solid lubricant, such as graphite or molybdenum disulfide, embedded in a metallic wear plate body. In certain applications, it is desirable to provide equal lubricity for sliding friction across the wear plate surface in either of two directions which are mutually perpendicular. This allows the mounting of the wear plate in either of two orientations for reciprocating motion.

In the prior art, it is a common practice to construct wear plates of flat metal bodies defining multiple circular cavities in the surface thereof with "inserts" solid lubricant embedded in the cavities. In a wear plate of this construction, the solid lubricant inserts must be relatively thick in order to withstand the loading on the wear plate without breakage. Typically, the lubricating inserts are formed as plugs with a thickness of about three-eighths inches and a diameter of about three-eighths inches. Wear plates using such plugs are relatively costly to manufacture.

In the prior art, the Nakamura U.S. Pat. No. 4,096,075 granted June 20, 1978 discloses a self-lubricated body with circular inserts of solid lubricant embedded in circular cavities in the surface of the body. In the construction described in this patent, the circular cavities are disposed in a pattern with a predetermined relationship of the distance between cavities and the diameter of the cavities with the cavities being arranged in rows extending at the certain angle. This arrangement is supposed to provide good lubricity in a predetermined direction as well as a direction normal thereto.

A general object of this invention is to provide an improved self-lubricated wear plate which exhibits equal lubricity in either of two mutually perpendicular directions.

SUMMARY OF THE INVENTION

In accordance with this invention, an improved self-lubricated wear plate is provided which exhibits equal lubricity in either of two mutually perpendicular directions and yet is of simple construction, economical to manufacture and is very durable and reliable in operation. This is accomplished by a metal body with a wear surface including plural strip-shaped metal lands which are unitary with the metal body and define a groove in the body between adjacent lands. The lands and grooves have parallel edges and extend across the surface at an angle of about forty-five degrees to one edge of the body. Each groove is filled with a strip of solid lubricant and the exposed surfaces of the lands and the strips are co-planar. The body, which is preferably rectangular, is adapted to be mounted for sliding motion in either of two mutually perpendicular directions which extend at about forty-five degrees to the direction of said lands and grooves. Further, according to the invention, the total area of the surface is approximately thirty percent lubricant and the remainder is metal lands. Further, the thickness of the solid lubricant strips can be less than one-third the width thereof. The solid lubricant may be an oil impregnated graphite and the strips are secured in the grooves by epoxy resin.

A more complete understanding of this invention may be obtained from the detailed description that follows taken with the accompanying drawings.

BEST MODE FOR CARRYING OUT THE INVENTION

Figure 1:
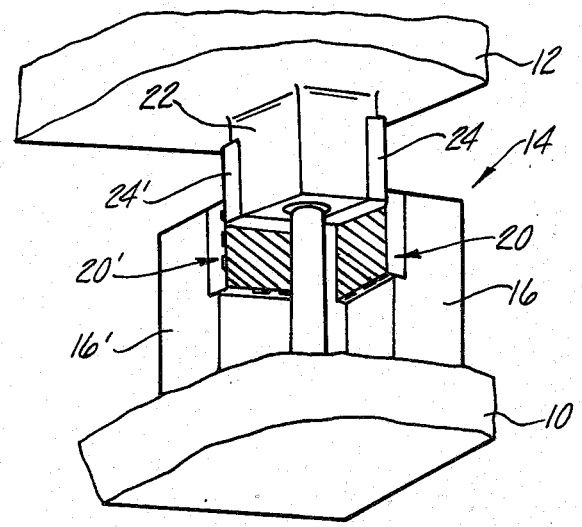
FIG. 1 is a perspective view of part of a machine in which wear plates, according to this invention, are installed.

Referring now to the drawings, there is shown an illustrative embodiment of the invention in a wear plate for use on reciprocating members of industrial machines such as presses. In this embodiment the wear plate is a rectangular metal body adapted for mounting in either of two orientations to provide equal lubricity for sliding friction in a direction perpendicular to either of two adjacent edges of the plate. It will be appreciated that the invention is useful in other applications and embodiments.

FIG. 1 depicts a typical installation of wear plates of this invention on an industrial machine, such as a power press. In such an installation, a fixed or base platen 10 and an upper or movable platen 12 carry a set of dies (not shown) therebetween. The dies are closed and opened by lowering and raising of the movable platen 12 in a rectilinear or reciprocating movement by the power mechanism of the press. For the purpose of maintaining axial alignment of the platens 10 and 12, notwithstanding the lateral forces exerted thereon such as those resulting from die closing, the platens are provided with a guide mechanism. In the exemplary installation, the guide mechanism comprises a guideway 14 at each of the four corners of the base platen and movable platen. In general, the guideway 14 comprises a pair of fixed posts or bosses 16 and 16' mounted upon and suitably unitary with the base platen 10. A pair of wear plates 20 and 20', each constructed according to this invention, are mounted upon the fixed bosses 16 and 16', respectively. An upper boss 22, suitably of rectangular cross-section is mounted upon the movable platen 12 and is located adjacent the fixed bosses 16 and 16'. A pair of slide plates 24 and 24' are disposed opposite the wear plates 20 and 20', respectively, so as to form a pair of slide bearings. A cylindrical guide column 26 is fixed to the base platen 10 and extends through a guide passage in the upper boss 22. In this arrangement, the slide bearing comprising wear plate 20 and slide plate 24 and the slide bearing comprising wear plate 20' and slide plate 24' are disposed so as to carry side loads or lateral thrust forces between the machine members, i.e. the platens 10 and 12. The slide plates 24 and 24' are suitably constructed of steel with a flat outer surface. The wear plates 20 and 20' are identical to each other and the structure will be described in detail with reference to wear plate 20.

Figure 2:
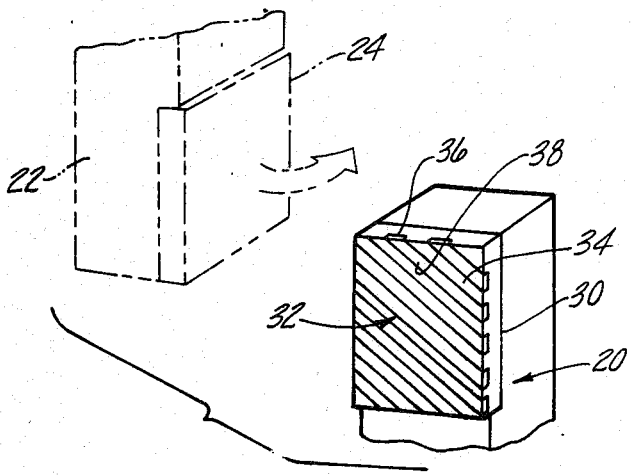
FIG. 2 is a view of a wear plate of this invention with a complementary slide plate.
Figure 3:
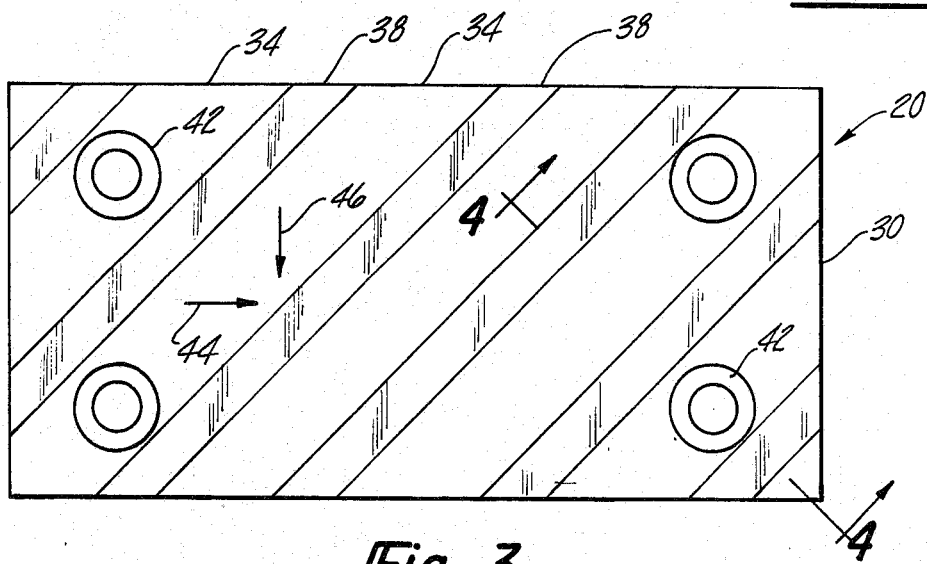
FIG. 3 is an elevation view of the self-lubricated surface of the slide plate.
Figure 4:
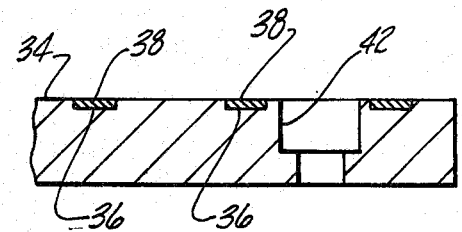
FIG. 4 is a view taken on lines 4—4 of FIG. 3.

The wear plate 20 is shown in detail in FIGS. 2, 3 and 4. It comprises a rectangular metal body 30 having a composite wear surface 32. The composite wear surface 32 includes a plurality of strip-shaped metal lands 34 which extend parallel to each other. Each pair of adjacent lands 34 define a groove 36 therebetween. Each land 34 has parallel edges hence the edges of the grooves 36 are parallel to each other. Each of the grooves 36 is filled with an insert or strip of solid lubricant 38. Preferably, the solid lubricant is an oil impregnated graphite but it also may take the form of molybdenum disulfide or polytetrafluoroethylene or a mixture of such material. The oil impregnated graphite strip is sold by St. Mary's Carbon Company of St. Mary's, Pa. under the designation of Model 1G. The solid lubricant strip has a clearance fit in the groove of about 0.002 inches and is secured in the groove to the metal body by epoxy resin. The outer surfaces of the solid lubricant strips 38 are made co-planar with the surfaces of the lands 34, suitably by grinding the wear surface flat after the strips are installed. The rectangular metal body 20 is provided with a set of counterbored mounting holes 42 for mounting of the wear plate onto the boss 16 by machine screws.

The metal lands 34 and the solid lubricant strips 38 are disposed at an angle of about forty-five degrees to the edges of the rectangular body 30. the wear plate 20 is mounted onto the boss 16 in either of two orientations in which the sliding motion relative to the slide plate 24 is parallel to the arrow 44 or arrow 46 (FIG. 2). Thus it is perpendicular to one of the adjacent edges of the rectangular body. Stated otherwise, regardless of the shape of the body, it is adapted to be mounted in either of two orientations in each of which the sliding motion relative to the slide block 24 is in a direction of about forty-five degrees to the solid lubricant strips 38. The wear plate 20 provides equal lubricity for sliding motion in a direction parallel to the arrow 44 and in a direction parallel to the arrow 46 in FIG. 3. Thus, the wear plate 20 as shown in FIG. 2 could be reoriented on the boss 16 by rotating it in the plane of the wear surface through ninety degrees and it would perform the same as in the orientation shown.

A typical embodiment of the invention comprises a rectangular wear plate which is six inches by six inches. The size may typically range from two inches by three inches up to six inches by eighteen inches. The wear plate body may be made of steel or of a suitable alloy. The width of the self-lubricated strips is approximately three-eighths inches and the width of the lands is approximately one inch. The self-lubricated strips are approximately one-tenth inch thick. Approximately thirty percent of the wear surface is covered by the self-lubricated strips.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A wear plate for sliding contact between members of a machine, said plate being mounted on one of said members in face-to-face opposition with a surface on another of said members, means for constraining the sliding motion between said wear plate and said member to a predetermined direction, said wear plate comprising:

a metal body having a composite wear surface including plural parallel strip-shaped metal lands unitary with said metal body and including plural glooves in said body defined by said lands, each of said grooves being filled with a strip of solid lubricant with the exposed surfaces of said lands and strips being co-planar, means for mounting said wear plate on said one of said members in a selected one of either of two orientations in which said grooves are disposed at an angle of about forty-five degrees to said predetermined direction, whereby said body exhibits equal lubricity when mounted in either of said two orientations for sliding motion in said predetermined direction.

2. The invention as defined in claim 1 wherein the solid lubricant occupies approximately thirty percent of said surface and said lands occupy the remainder.

3. The invention as defined in claim 1 wherein said solid lubricant is an oil impregnated graphite and each of said strips of solid lubricant has a thickness which is less than one-third the width.

4. The invention as defined in claim 1 wherein each strip of solid lubricant is secured in its respective groove by epoxy resin.

5. The invention as defined in claim 1 wherein said metal body is rectangular and said metal lands extend at an angle of about forty-five degrees to one edge of the body.

* * * * *